(12) United States Patent
Liang et al.

(10) Patent No.: US 9,457,229 B2
(45) Date of Patent: Oct. 4, 2016

(54) SENSOR-BASED GAMING SYSTEM FOR AN AVATAR TO REPRESENT A PLAYER IN A VIRTUAL ENVIRONMENT

(71) Applicant: Applejack 199 L.P., Los Altos, CA (US)

(72) Inventors: Jun Liang, Lewisham (AU); Ann Koo, Los Altos, CA (US); Nicolai Maltsev, Los Altos, CA (US)

( * ) Notice: Subject to any disclaimer, the term of this patent is extended or adjusted under 35 U.S.C. 154(b) by 164 days.

(21) Appl. No.: 14/243,575

(22) Filed: Apr. 2, 2014

(65) Prior Publication Data

US 2014/0235348 A1 Aug. 21, 2014

Related U.S. Application Data

(63) Continuation-in-part of application No. PCT/IB2013/061229, filed on Dec. 20, 2013.

(30) Foreign Application Priority Data

Dec. 21, 2012 (DE) .................. 10 2012 224 321

(51) Int. Cl.
*G07F 17/32* (2006.01)
*G06F 3/01* (2006.01)
(Continued)

(52) U.S. Cl.
CPC .......... *A63B 24/0006* (2013.01); *A63B 69/36* (2013.01); *A63B 69/3632* (2013.01); *A63F 13/21* (2014.09); *G01P 15/18* (2013.01);
(Continued)

(58) Field of Classification Search
CPC .. G07F 17/3223; A63F 13/21; A63F 13/211; A63F 13/212; A63F 13/213; G06F 3/011
See application file for complete search history.

(56) References Cited

U.S. PATENT DOCUMENTS 5,233,544 A   8/1993  Kobayashi
5,779,545 A * 7/1998  Berg ................... G07F 17/3223
                                                      463/22

(Continued)

FOREIGN PATENT DOCUMENTS

EP      2597582        5/2013
JP    2009140492 A    6/2009
(Continued)

OTHER PUBLICATIONS

International Search Report dated Apr. 23, 2014 as received in Application No. PCT/IB2013/061229.
(Continued)

*Primary Examiner* — William H McCulloch, Jr.

(57) ABSTRACT

A method of providing a sensor-based gaming system for an avatar to represent a player in a virtual environment includes wirelessly receiving a set of measurements describing attributes of the player. The method includes generating a player profile associated with the player and including an avatar depicting a virtual embodiment of the player in a virtual world. The method includes receiving sensor data from sensors. The sensor data describes a change in a real world position of the player. The method includes determining an estimate of a player movement. The method includes determining a difference between a screen position of the avatar in the virtual world and the real world position of the player in the real world. The method includes generating avatar image data representative of movement of the avatar corresponding to movement of the player.

18 Claims, 9 Drawing Sheets

Although two players 102A, 102B are depicted, there can be any number of players 102A, 102B. The players 102A, 102B may be humans, animals or any object (whether living or non-living).

(51) Int. Cl.
| | | |
|---|---|---|
| A63F 13/21 | (2014.01) | |
| A63F 13/211 | (2014.01) | |
| A63F 13/212 | (2014.01) | |
| A63F 13/213 | (2014.01) | |
| A63B 24/00 | (2006.01) | |
| A63B 69/36 | (2006.01) | |
| G01P 15/18 | (2013.01) | |
| A63B 53/10 | (2015.01) | |

(52) U.S. Cl.
CPC .......... *G06F3/011* (2013.01); *G07F 17/3223* (2013.01); *A63B 24/0003* (2013.01); *A63B 53/10* (2013.01); *A63B 2024/0009* (2013.01); *A63B 2024/0012* (2013.01); *A63B 2024/0015* (2013.01); *A63B 2220/24* (2013.01); *A63B 2220/34* (2013.01); *A63B 2220/40* (2013.01); *A63B 2220/44* (2013.01); *A63B 2220/62* (2013.01); *A63B 2220/806* (2013.01); *A63B 2225/20* (2013.01); *A63B 2225/50* (2013.01); *A63F 13/211* (2014.09); *A63F 13/212* (2014.09); *A63F 13/213* (2014.09); *A63F 2300/1012* (2013.01)

(56) References Cited

U.S. PATENT DOCUMENTS

| | | | | |
|---|---|---|---|---|
| 5,913,727 A * | 6/1999 | Ahdoot | .................... | A63F 13/06 345/156 |
| 7,855,683 B2 * | 12/2010 | Razoumov | .............. | G01S 19/48 342/357.25 |
| 8,251,821 B1 * | 8/2012 | Yen | .......................... | A63F 13/02 463/31 |
| 8,386,918 B2 | 2/2013 | Do et al. | | |
| 8,777,737 B2 | 7/2014 | LeMay et al. | | |
| 9,272,199 B2 * | 3/2016 | Richter | ................... | G01P 15/18 |
| 9,358,426 B2 * | 6/2016 | Aragones | ............ | G06F 19/3437 |
| 2003/0207718 A1 | 11/2003 | Perlmutter | | |
| 2006/0241392 A1 * | 10/2006 | Feinstein | .............. | A61B 5/0006 600/422 |
| 2007/0206837 A1 | 9/2007 | Kirby | | |
| 2009/0031240 A1 * | 1/2009 | Hildreth | .................. | G06F 3/011 715/772 |
| 2009/0111582 A1 * | 4/2009 | Schuler | .............. | A63B 24/0021 463/42 |
| 2009/0273559 A1 * | 11/2009 | Rofougaran | ............ | G01S 7/412 345/156 |
| 2009/0292178 A1 * | 11/2009 | Ellis | .................... | A63B 24/0059 600/301 |
| 2010/0210371 A1 | 8/2010 | Sato et al. | | |
| 2011/0053698 A1 | 3/2011 | Stites et al. | | |
| 2011/0195780 A1 | 8/2011 | Lu | | |
| 2011/0244952 A1 * | 10/2011 | Schueller | ................ | G07F 17/32 463/27 |
| 2012/0315986 A1 * | 12/2012 | Walling | .................. | A63F 13/10 463/31 |
| 2012/0315987 A1 * | 12/2012 | Walling | .................. | A63F 13/10 463/31 |
| 2014/0235348 A1 * | 8/2014 | Liang | ...................... | G01P 15/18 463/36 |
| 2015/0343293 A1 * | 12/2015 | Koo | ........................ | G01P 15/18 702/141 |
| 2016/0070296 A1 * | 3/2016 | Koo | ........................ | G06F 1/163 361/679.03 |
| 2016/0101316 A1 * | 4/2016 | Richter | ................... | G01P 15/18 473/223 |

FOREIGN PATENT DOCUMENTS

| | | |
|---|---|---|
| JP | 2009533138 A | 9/2009 |
| JP | 2011520556 A | 7/2011 |
| JP | 2013540454 A | 11/2013 |
| JP | 2014502178 A | 1/2014 |
| KR | 20080045359 | 5/2008 |
| KR | 20130116886 | 10/2013 |
| WO | 2007/096069 A2 | 8/2007 |
| WO | WO-2012061804 | 5/2012 |

OTHER PUBLICATIONS

Written Opinion of the International Searching Authority dated Apr. 23, 2014 as received in Application No. PCT/IB2013/061229.
International Search Report dated Jul. 2, 2015 as received in Application No. PCT/US2015/024056.
Written Opinion of the International Searching Authority dated Jul. 2, 2015 as received in Application No. PCT/US2015/024056.
Japanese Application Serial No. 2015-063531, JP Office Action mailed May 17, 2016, 14 pgs.

* cited by examiner

SENSOR-BASED GAMING SYSTEM FOR AN AVATAR TO REPRESENT A PLAYER IN A VIRTUAL ENVIRONMENT

CROSS-REFERENCE TO RELATED APPLICATIONS

This application is a continuation-in-part of PCT International Application no. PCT/IB2013/061229, filed Dec. 20, 2013, which claims priority to German application no. 10 2012 224 321.6, filed Dec. 21, 2012. The foregoing applications are incorporated herein by reference.

FIELD

The embodiments discussed herein are related to a sensor-based gaming system for an avatar to represent a player in a virtual environment.

BACKGROUND

Gaming systems are increasing in popularity. The gaming systems may be gaming consoles, personal computers, laptops, tablet computing devices, smartphones, video-streaming set-top boxes, etc. As gaming systems become more popular, there is a need for a greater diversity of games to be played on these different platforms.

SUMMARY

Embodiments may include a gaming system to enable one or more players to play a video game. A player has one or more sensors. For example, the player is a human wearing a wrist band, a knee band, an ankle band, etc. The bands may be located on any part of the player's body. A player may have any combination of different bands on different locations of the player's body. The bands may include any number of different sensors. The sensors may include one or more of heartbeat sensor, microphone, pressure sensor, accelerometer, gyroscope, pedometer, wearable electromyography sensor, etc. The wrist band may be configured to function as a wrist watch when not being used for gaming. The wrist band may include one or more feedback devices such as a LED display, micro-vibrator, or speaker. The sensors may be a component of three-dimensional goggles worn by the player.

The video game may be a gambling game, single player avatar motion game or multiple player avatar motion game. The video game may include haptic or tactile feedback.

In embodiments where the video game is a gambling game, the player's motion may provide sensor data that is a seed to a random number generator. The player may move their body. The sensors may detect the player movement and generate sensor data describing the player movement. The sensors may transmit sensor data to a processor-based computing device. The computing device may include a software-based random number generator. The sensor data may seed the random number generator and be used to generate one or more random numbers. The random numbers may then be used in a game of chance.

In embodiments where the video game is a single player avatar motion game, the player may have a player profile. The player profile may include measurements corresponding to the player. The measurements may be used along with sensor data to estimate the player's motions. The player may have one or more avatars to represent the player in a virtual world of a video game. The avatar may move on a display screen to approximately replicate the motion of the player. The avatar may include a three-dimensional image of the player as the player exists in the real world. In this way, the avatar may be personalized to a look like a player. The avatar may include any image depicted in the virtual world. The video game may include in-application purchases or online purchases. For example, the video game may include an online store in which players can purchase attributes (weapons, armor, abilities, etc.) for their avatars or player profiles.

In embodiments where the video game is a multiple player avatar motion game, the players may be in different geographical locations or in the same geographic location. For example, a first player may be in the United States and a second player may be in China. The first player and the second player may interactively play the game together. Their respective avatars may interactive with each other so that the avatars replicate each player's movement in real time or near real time (e.g., 0.1 to 0.09 seconds of delay between a player's movement and the corresponding movement of the avatar). In some embodiments, one of the players may be an animal or a non-living object. For example, one of the players may be a teapot having a sensor installed in it to measure the temperature or pressure inside the cavity of the teapot. The game may be configured to enable a player to play against themselves. For example, the first player may play against a second player. The movements of the second player's avatar may be generated based on the mirror image or reverse mirror image of the first player's movements so that the first player is effectively playing against themselves. In some embodiments, a player may play with a time shifted version of their self. For example, a player plays the game on Monday. The game may be a golf game or any other game. The actions of the player's avatar may be recorded or otherwise stored in a memory. The recorded avatar may then be overlaid on the screen at any subsequent time when the player's real time avatar is also on the screen. For example, Tuesday, the player may choose to play with a time shifted version of their self as represented by the recorded avatar from Monday. Assume, for example, that on Monday the player used the avatar to record a golf swing. On Tuesday the recorded avatar may appear on screen with the player's real time avatar so that the player may compare their golf swing on Tuesday to their golf swing on Monday.

According to an aspect of an embodiment, a method may include wirelessly receiving a set of first measurements associated with a first player. The set of first measurements may describe one or more attributes of the first player. The method may include generating, based on the first measurement, a first player profile associated with the first player and including a first avatar depicting a virtual embodiment of the first player in a virtual world. The method may include wirelessly receiving first sensor data from a plurality of first sensors associated with the first player. The first sensor data may describe a change in a real world position of the first player in a real world. The method may include determining a first estimate of a first player movement based on the set of first measurements and the first sensor data. The method may include determining a first difference between a first screen position of the first avatar in the virtual world and the real world position of the first player in the real world. The method may include generating first avatar image data representative of movement of the first avatar corresponding to movement of the first player. The first avatar image data may be generated based on the first difference between the first screen position of the first avatar in the virtual world and the real world position of the first player in the real world.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The embodiments discussed herein are related to providing a sensor-based gaming system for an avatar to represent a player in a virtual environment.

Embodiments of the present invention will be explained with reference to the accompanying drawings.

Figure 1:
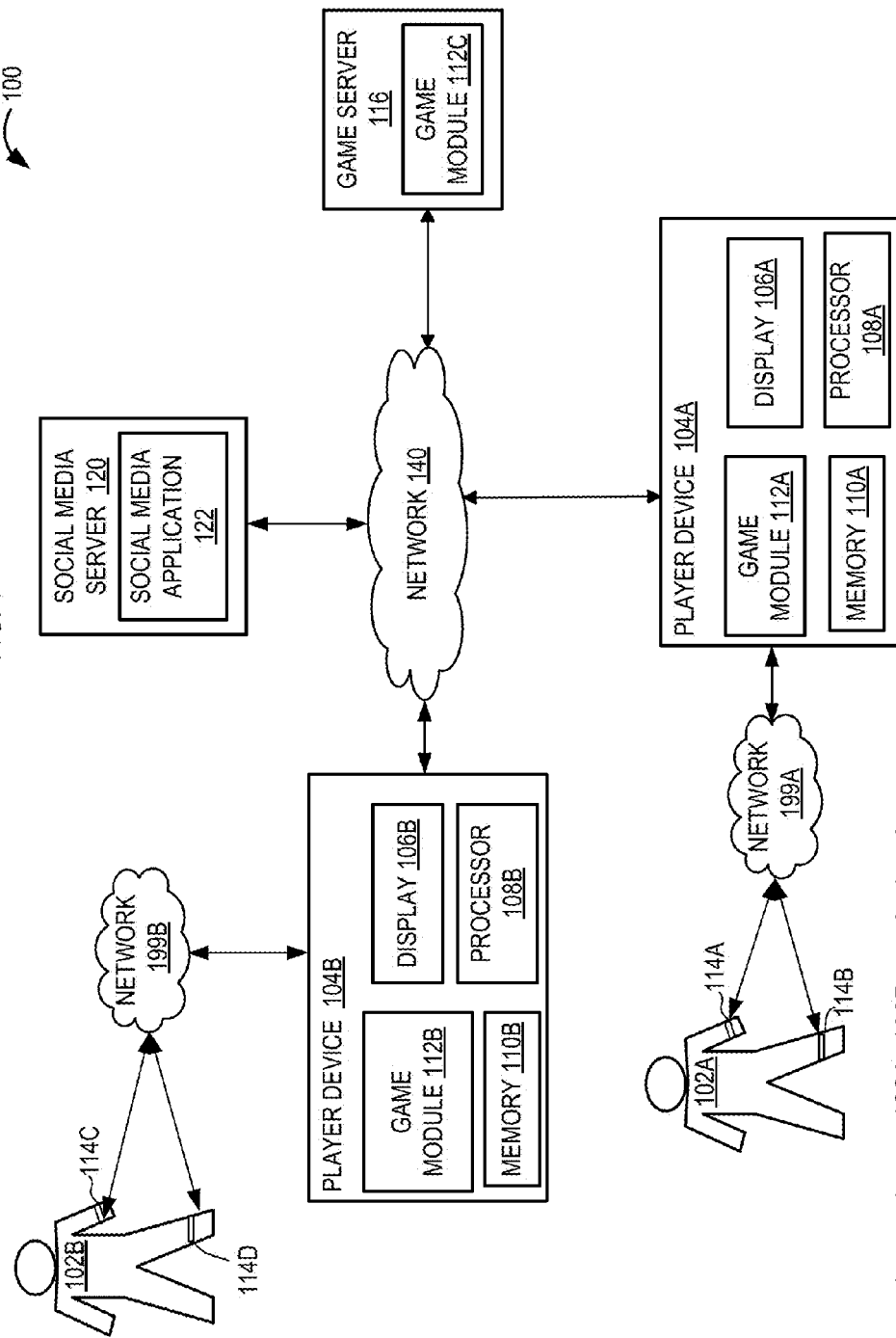
FIG. 1 is a block diagram of an example operating environment in which a sensor-based gaming system may be implemented.

FIG. 1 is a block diagram of an example gaming system 100, arranged in accordance with at least one embodiment described herein.

A player 102A, 102B (herein referred to collectively or individually as "players 102" or "player 102," respectively) is a user of the gaming system 100. The player may be a living or non-living object. For example, the player may be a human, dog, horse, teapot or any other object adapted with one or more sensors 114A, 114B, 114C, 114D. The sensors 114A, 114B, 114C, 114D (referred to collectively or individually as "sensors 114" or "sensor 114," respectively).

A sensor 114 may determine or retrieve sensor data. The sensor data may include information describing one or more conditions, parameters or measurements associated with the player 102. For example, the sensor 114 may be a heartbeat sensor, microphone, pressure sensor, accelerometer, gyroscope, pedometer, wearable electromyography sensor, etc. The sensor 114 may be a sensor configured to measure one or more of the parameters of the player 102.

The sensor data may describe real time or near real time conditions, parameters or measurements associated with the player 102. The sensors 114 may include a memory for storing sensor data or other data. The sensors 114 may be embodied in a wristwatch, smartwatch or processor-based connected device. The wristwatch, smartwatch or processor-based connected device may include cartoon characters or other embellishments to make them more attractive to young people or some other demographic.

FIG. 1 depicts an example system 100 having two players 114. However, in practice the system 100 may include one or more players 102. Similarly, in FIG. 1 each player 102 is depicted having two sensors 114. However, in practice each player may have one or more sensors 114.

The sensors 114 may be communicatively coupled to the player device 104A, 104B (referred to collectively or individually as "player devices 104" or "player device 104," respectively) via a network 199A, 199B (referred to collectively or individually as "networks 199" or "network 199," respectively). Sensor data may be transmitted to the player device 104 via the network 199. The transmission of sensor data may be of a "pull type," a "push type" or a "buffer type." In some implementations, the network 199 may include Bluetooth communication networks or a cellular communications network for sending and receiving data including via short messaging service (SMS), multimedia messaging service (MMS), hypertext transfer protocol (HTTP), direct data connection, WAP, email, etc. In one embodiment, the sensors 114 transmit the sensor data to a Bluetooth hub and the Bluetooth hub transmits the data to the network 199. The network 199 may be a conventional type, wired or wireless, and may have numerous different configurations including a star configuration, token ring configuration or other configurations. Furthermore, the network 199 may include a local area network (LAN), a wide area network (WAN) (e.g., the Internet), or other interconnected data paths across which multiple devices may communicate. In some implementations, the network 199 may be a peer-to-peer network. The network 199 may also be coupled to or include portions of a telecommunications network for sending data in a variety of different communication protocols.

The player device 104 may be a processor-based computing device. For example, the player device 104 may be a gaming console, personal computer, laptop, tablet computing device, smartphone, video-streaming set-top box, connected device, etc. The player device 104 may operate using any platform. For example, the player device may be operable using Windows, Linux, OSX, iOS, Tizen, Android, Symbian or any other platform.

The player device 104 may include a memory for storing and processing sensor data. The player device 104 may be communicatively coupled to a display or any other peripheral to provide feedback or input for the player 102. The player device 104 may be configured to provide a gaming experience or application for the player 102. The gaming experience or application may be an online game. The gaming experience or application may be of one or more types: training/education; gaming/combat; gambling; sports/health; etc. Each of these example gaming experiences or applications is described below.

For training/education gaming experiences or applications, the sensors 114 may include one or more accelerometers having the ability to capture the intensity of the physical activity of a player 102 that is a living or non-living object. A living object will be able to learn or be trained to follow the desired movement from an avatar and observe the differences between actual movement and the desired movement. In this way, the player 102 is trained or educated by the gaming experience or application provided by the player device 104. For example, the player 102 may use the player device 104 to develop a better golf swing or any other motion that relies on muscle memory.

For gaming/combat gaming experiences or applications, the game style may be of any type. In some embodiments, the game style is a third-person shooter game. The game style may have a "behind the back" perspective but may allow a player 102 to use a first-person viewpoint for precise physical action. The gaming experience or application provided by the player device 104 may be developed to use the sensors 114 as input. The gaming experience or application provided by the player device 104 may be developed to use a display as output. The display may be a screen of a mobile device, tablet or any other computing device.

The gaming/combat gaming experience or application provided by the player device 104 may be developed to enable one to one, one to many or many to many players 102 to simultaneously consume the gaming experience or application.

The gaming/combat gaming experience or application provided by the player device 104 may be developed to enable the sensors 114 to provide or transmit actual position and motion data to the player device 104, thereby enabling an avatar associated with a player to have real time or near real time motions on screen in the virtual gaming environment that correspond to the motions of the player 102 in the real world. This will be explained in more detail with reference to FIGS. 2-6. Other gaming platforms may not enable the sensors 114 to provide or transmit actual position and motion data to the player device 104 as provided by the system 100.

The gaming/combat gaming experience or application provided by the player device 104 may have many differences from other gaming experiences or applications. Example differences include: the sensors 114 used by the player device 104 may be a wearable connected device; the gaming experience or application may be an online game; the gaming experience or application may be played on a mobile device, tablet computer or laptop in any location where network connectively is accessible (e.g., the WiFi, 3G, 4G, etc.); two or more players 102 may play against each other in the same game without having to be in the same geographic location at the same time; players 102 may form teams to complete campaigns or missions in the game; players 102 may play against each other as competition; players 102 may be rewarded with prizes such as virtual coins (multi-currency) or electronic currency; the game may include an online store or an ability for in-application purchases via an online marketplace; players 102 may make in-application or online store purchases such as buying virtual equipment, weapons, armor, skill sets, etc. to improve their avatar's abilities in the virtual gaming world; players 102 may bid or gamble on the competitions for outcomes of the gaming experience and be rewarded with virtual coins (multi-currency) or electronic currency as a prize, which may then be used for purchases as previously described; players 102 may provide inputs to create personalized avatars; players 102 may upload one or more pictures of themselves, their pets or any other object to create personalized avatars; at least a portion of the personalized avatars may include three-dimensional representations of the pictures uploaded by the players 102 (multiple pictures may be used to generate a three-dimensional rendering of the subject of the pictures); etc. The differences listed above are examples, and persons having ordinary skill in the art will recognize other differences.

For gaming/combat gaming experiences or applications, the game structure may include one or more of the following: a training period in which a player 102 may follow the step-by-step instructions of a virtual in-game coach to practice skills and tricks; "player versus system competition" in which a player 102 may select a virtual opponent to compete against and the virtual opponent automatically accepts the competition; "player versus player in one-on-one competition" in which a first player 102 may choose a second player 102 to compete against (the selection of opponents may be random and each player 102 may be able to view their competitor's skill set or outfit grading before entering the competition); "player playing solo"; "player versus player in one-to-many or many-to-many competition"; a "challenge mode" in which players 102 may accept competition automatically; or a "bidding mode" in which players 102 may watch other players 102 compete and bid on the competition. In bidding mode, players 102 may join in a competition during a starting countdown prior to the competition beginning; players 102 in the same geographic location may not be allowed to bid on the competition in order to prevent cheating, however, these players 102 may still watch or fight in the competition if the competition is configured to allow players 102 to join.

For gaming/combat gaming experiences or applications, players 102 may learn skills using feedback associated with training lessons similar to those described above for "training/education gaming experiences or applications." Players 102 may practice new skills, purchase new skills sets from the store or marketplace or win new skill sets via competition or bidding. The skills are associated with the player's profile or avatar. Players 102 may use the skills to complete tasks in the game. Example skills may include one or more of: striking; chopping; punching; and any other motion that may correspond to the motions of the players 102 in the real world.

The player 102 may also purchase or acquire tricks. The tricks may be associated with the player's profile or avatar. The tricks may include one or more of: multiplying an avatar to any number of identical avatars in the game that may be controlled by the player 102 to combat opponents, perform tasks, accomplish missions, etc; causing an avatar to disappear or reappear; causing an avatar to expand or get bigger; causing an avatar to shrink or get smaller; and causing an avatar to freeze their opponent; causing an avatar to manipulate their environment with fire, rain, wind, moving rocks, etc. These tricks may be triggered by a particular motion detected by a sensor 114 or any other trigger. Tricks may be triggered by a microphone or camera detecting a particular input or combination of inputs from a player 102. A trick may be triggered by a player 102 input to two or more different types of sensors 114. For example, the player must make a particular action while speaking a certain word (or combination of words) in order to trigger the trick. Tricks may occur at random. The player 102 may be able to program the game to trigger certain tricks with certain motions detected by the sensors 114. The tricks may include "transforming" any graphical object in the virtual world to another graphical object, form or type. The transformations may include transforming an avatar to rock, fire, water, animals or any other object, form or type. The tricks may include the ability of a player 102 to transform their opponent as described above. The tricks may be triggered by user action. The tricks may include the ability to exchange avatars among different players 102.

For gaming/combat gaming experiences or applications, the player 102 may select a "single player avatar motion game" or a "multiple player avatar motion game."

In embodiments where the gaming experience or application is a single player avatar motion game, the player 102 may have a player profile. The player profile may include measurements corresponding to the player 102. If the player 102 is a human, the measurements may be biological measurements corresponding to one or more attributes of the human. For example, the measurements may be the player's height, weight, arm length, leg length, length from shoulder to elbow, or any other measurement of the human body. The measurements may be used along with sensor data to estimate the motions of the player 102. The player 102 may have one or more avatars to represent the player 102 in a virtual world of the gaming experience or application. The avatar may move on a display screen to approximately replicate the motion of the player 102 in the real world. The avatar may include a three-dimensional image of the player 102 as the player exists in the real world. In this way, the avatar may be personalized to a look like the player 102.

In embodiments where the gaming experience or application is a multiple player avatar motion game, the players 102 may be in different geographical locations or the same geographic locations. For example, a first player 102 may be in the United States and a second player 102 may be in China. The first player 102 and the second player 102 may interactively play the game together. Their respective avatars may interactive with each other so that the avatars replicate the movement of the different players 102 in real time or near real time (e.g., 0.1 to 0.09 seconds of delay between a movement of the player 102 in the real world and the corresponding movement of the avatar in the virtual world). One or more of the avatars on the screen may be time shifted version of player from an earlier time as described above.

For gambling gaming experiences or applications, players 102 may move and their movement may be detected by one or more sensors 114, thereby producing sensor data corresponding to the movement of the player 102. Movement of the player 102 may not be exactly the same from one instance of movement to another instance of movement. Accordingly, the sensor data for two different movements may be different. The sensor data is used as a seed to a random number generator which generates the random numbers underlying electronic games of chance. Because movement of the player 102 may not be exactly the same from one instance of movement to another instance of movement, the random numbers outputted by the random number generator may be truly random, thereby providing a valid game of chance.

For sports/health gaming experiences or applications, a player 102 may move and use the sensors 114 to provide input to the player device 104. The player 102 may play golf, football, baseball, sword fighting or any other electronic sport-based gaming experience or application provided by the player device 104.

The player device 104 may include one or more of a game module 112A, 112B (referred to collectively or individually as "game modules 112" or "game module 112," respectively), display device 106A, 106B (referred to collectively or individually as "display devices 106" or "display device 106," respectively), memory 110A, 110B (referred to collectively or individually as "memories 110" or "memory 110," respectively), and processor 108A, 108B (referred to collectively or individually as "processors 108" or "processor 108," respectively).

The game module 112 may be code and routines configured to provide the gaming experiences or applications of the player device. The functionality of the game module 112 may be provided at the player device 104 or the game server 116. In some embodiments, some aspects of the functionality of the game module 112 are provided at the player device 104 while other aspects of the functionality of the game module 112 are provided at the game server 116. The game module will be described in more detail below with reference to FIGS. 2-6. The game server 116 may be a cloud server configured to provide back-end processor for the player device 104. The game server 116 will be described in more detail below in subsequent paragraphs.

The display 106 may be a conventional display device configured to render graphical images. The display 106 may be a separate peripheral that is communicatively coupled to the player device 104 (e.g., a computer monitor or television connected to a gaming console), three dimensional goggles, or an integrated element of the player device 104 (e.g., the display 106 is an LED display of a smartphone or tablet computing device).

The memory 110 may store instructions and/or data that may be executed by the processor 108. The instructions and/or data may include code for performing the techniques described herein. The memory 110 may be a dynamic random access memory (DRAM) device, a static random access memory (SRAM) device, flash memory, or some other memory device. In some instances, the memory 110 also includes a non-volatile memory or other permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the depicted embodiment, the memory 110 may store the sensor data or graphical data used for rendering gaming experiences for the player 102.

The processor 108 may be an arithmetic logic unit, a microprocessor, a general purpose controller, or some other processor array to perform computations and provide electronic display signals to a display device. The processor 108 processes data signals and may include various computing architectures including a complex instruction set computer (CISC) architecture, a reduced instruction set computer (RISC) architecture, or an architecture implementing a combination of instruction sets. Although FIG. 1 includes the single processor 108, multiple processors 108 may be included. Other processors, operating systems, sensors, displays, and physical configurations are possible.

The player device 104 may be connected to a network 140. The player device 104 may transmit data to and from other player devices 104, the social media server 120 or the game server 116 via the network 140. The player device 104 may include any hardware or software necessary to enable electronic communications with other player devices 104, the social media server 120 or the game server 116 via the network 140. The network 140 is similar to the network 199, and so, that description will not be repeated here.

The game server 116 may be a hardware server device. The game server 116 may be configured to provide back-end processing for one or more player devices 104. The game server 116 may include a processor, memory or any other components necessary for the game sever 116 to provide its functionality. The game server 116 may store the game module 112 in a memory of the game server 116. A processor of the game server 116 may execute the game module 112 to provide the functionality of the game module 112. The game server 116 may be particularly advantageous in embodiments where the player device 104 is a tablet computer, smartphone or similar processor-based computing devices. The game server 116 may include any hardware or software necessary to enable electronic communications with player devices 104 or the social media server 120 via the network 140. The game sever 116 may transmit data (e.g., graphic data) to the player device 104 via the network 140.

The social media server 120 may be configured to provide a social network service (e.g., FaceBook, Google+, Twitter, QQ, etc.). The social media server 120 may be a hardware server that includes a processor, a memory and network communication capabilities. In the illustrated implementation, the social media server 120 is coupled to the network 140. The social media server 120 sends and receives data to and from one or more of the devices 104, the host server 114, the finance server 116, and the search server 132 via the network 140. The social media server 120 includes a social network application 122. A social network can be a type of social structure in which the users 102 and multiple other users may be connected by a common feature. The common feature includes relationships/connections, e.g., friendship, family, work, an interest, and the like. The common features may be provided by one or more social networking systems including explicitly defined relationships and relationships implied by social connections with other online users, where the relationships form a social graph. In some examples, the social graph can reflect a mapping of the users and how they can be related. Furthermore, it should be understood that the social media server 120 and the social media application 122 can be representative of one social network and that there may be multiple social networks coupled to the network 140, each having its own server, application, and social graph. For example, a first social network may be more directed to business networking, a second may be more directed to or centered on academics, a third may be more directed to local business, a fourth may be directed to dating and others may be of general interest or a specific focus.

The player device 104 or the game server 116 may communicate with the social media server 120 to access the social graph and connect different players 102 of the player device 104 with one another. For example, players 102 connected with one another on the social graph may want to compete with one another or play on the same teams. The game module 112 may be configured to publish the progress of different players 102 to the profiles of the players 102 on the social network. The publications may be configured by the game module 112 to provide advertisements for the gaming service provided by the game module 112. The game module 112 may be configured so that different players 102 may interact with one another before or after gaming using the communications interfaces provided by the social network. A person having ordinary skill in the art will recognize other ways that the social media application 122 may be accessed and integrated with the game module 112.

In some embodiments, one or more of the game module 112 and the social media application 122 may be implemented using hardware including a field-programmable gate array (FPGA) or an application-specific integrated circuit (ASIC). In some other instances, the game module 112 and the social media application 122 may be implemented using a combination of hardware and software. Thus, the game module 112 and the social media application 122 may be implemented as a hardware device. In some embodiments, the game module 112 or the social media application 122 include sub-modules and one or more of the sub-modules are implemented as one or more hardware devices while other sub-modules are implemented as software that is stored in a memory and executable by a processor.

Figure 2:
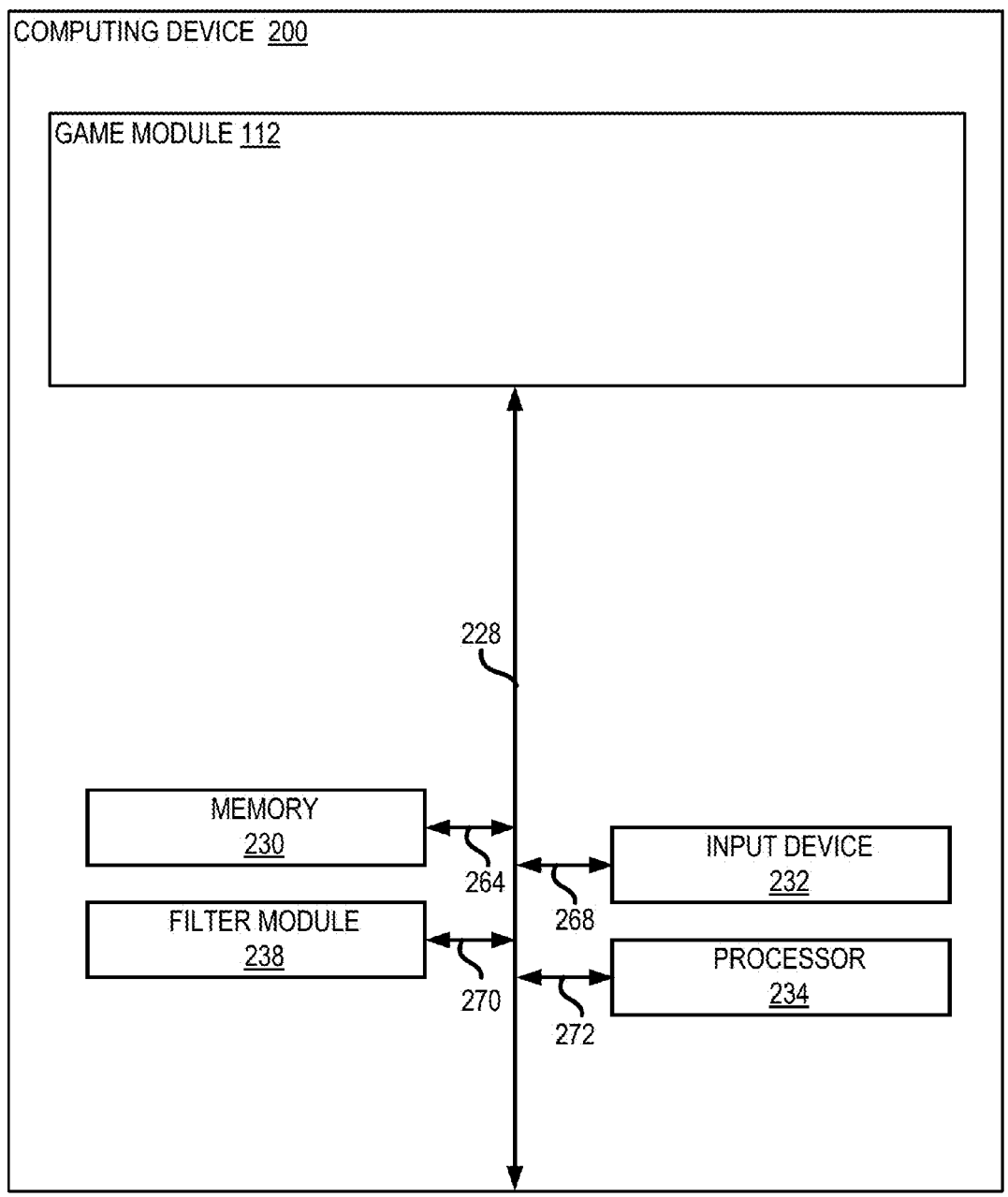
FIG. 2 is a block diagram of an example system for providing a sensor-based gaming system.

FIG. 2 is a block diagram of a computing device 200 for providing a sensor-based gaming system, arranged in accordance with at least one embodiment described herein. The device 200 of FIG. 2 is an example embodiment of the player device 104 of FIG. 1. In some embodiments, the system 200 may be a gaming console, mobile phone, a smartphone, a tablet computer, a laptop computer, a desktop computer or a set-top box. The game module 112 is code and routines configured to provide the functionality described below with reference to FIGS. 3-8.

The game module 112 may be communicatively coupled to a memory 230, an input device 232, a filter module 238 and a processor 234 via the bus 228. The memory 230 is similar to the memory described above with reference to memory 110, and so, that description will not be repeated here. The game module 112 may be stored on the memory in some embodiments. The memory 230 may be communicatively coupled to the bus 228 via signal line 264.

The input device 232 may be a keyboard, touchpad, touch sensitive screen, capacitive display (e.g., smartphone screen), three-dimensional camera (e.g., Microsoft™ Kinect™), microphone, or any other input device known in the art. The input device 232 230 may be communicatively coupled to the bus 228 via signal line 268.

The filter module 238 may be a code and routines configured to apply equations 8 or 9 of Appendix 1 to the sensor data or measurement data. The filter module 238 may be configured to reduce errors present in the data or increase stability of the data. The filter module 238 may then transmit the processed sensor data or measurement data to the game module 112. The filter module 238 may be communicatively coupled to the bus 228 via signal line 270. The filter module 238 may be stored in the memory 230. In one embodiment, graphical data for rendering avatars is generated based at least in part on equations 8 or 9 of Appendix 1.

The processor 234 is similar to the processor 108 described above with reference to FIG. 1, and so, that description will not be repeated here. The processor 234 may be communicatively coupled to the bus 228 via signal line 272.

FIGS. 3A, 3B, 3C and 3D show an example flow diagram of a method 300 of operating a sensor-based gaming system 100, arranged in accordance with at least one embodiment described herein. The method 300 in some embodiments is performed by a system such as the gaming system 100 of FIG. 1 or the system 200 of FIG. 2. For instance, the processor 234 of FIG. 2 may be configured to execute computer instructions stored on the memory 208 to perform functions and operations as represented by one or more of the blocks of the method 300 of FIG. 3. Although illustrated as discrete blocks, various blocks may be divided into additional blocks, combined into fewer blocks, or eliminated, depending on the desired implementation. The method 300 may be described below with reference to FIGS. 1 and 2.

The method 300 may begin at block 301. The method 300 may be provided by the game module 112. At block 301, a determination is made about whether the game is a gambling game. If the game is a gambling game, the method 300 proceeds to block 306. If the game is not a gambling game, the method 300 proceeds to block 303. At block 303, a determination is made about whether the game is a single player avatar motion game. If the game is a single player avatar motion game, then the method 300 proceeds to block 312 of FIG. 3B. If the game is not a single player avatar motion game, the method proceeds to block 305. At block 305, a determination is made about whether the game is a multiple player avatar motion game. If the game is a multiple player avatar motion game, then the method 300 moves to block 326 of FIG. 3C. If the game is not a multiple player avatar motion game, then the method 300 ends.

At block 306, the game module 112 receives sensor data. The sensor data may be aggregated by the player device 104 or a computing device 200. At block 308 a random number is generated based on the sensor data. At block 310 the data describing the random number is transmitted to the player device.

Figure 3A:
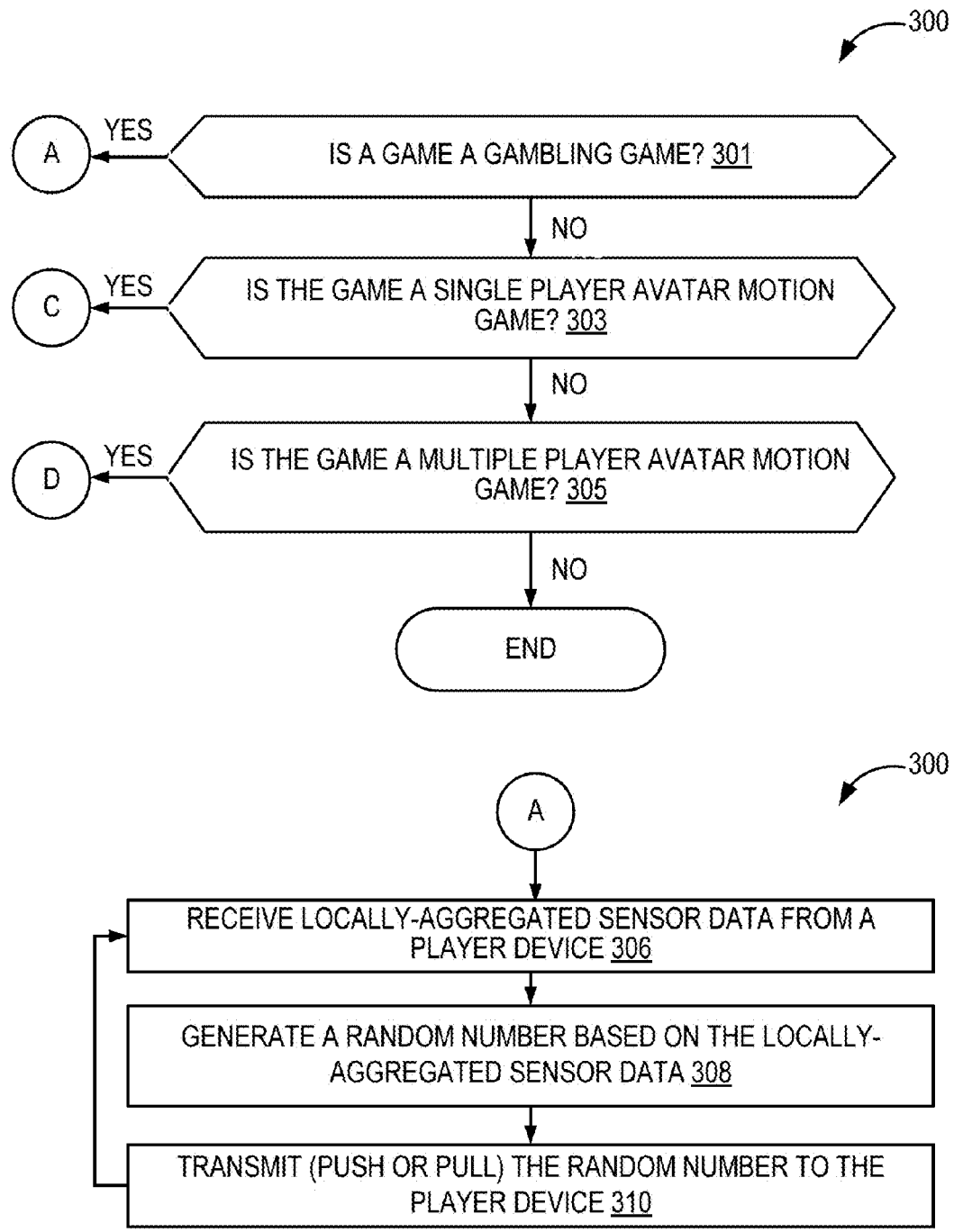
FIG. 3A shows an example flow diagram of a method of operating a sensor-based gaming system.
Figure 3B:
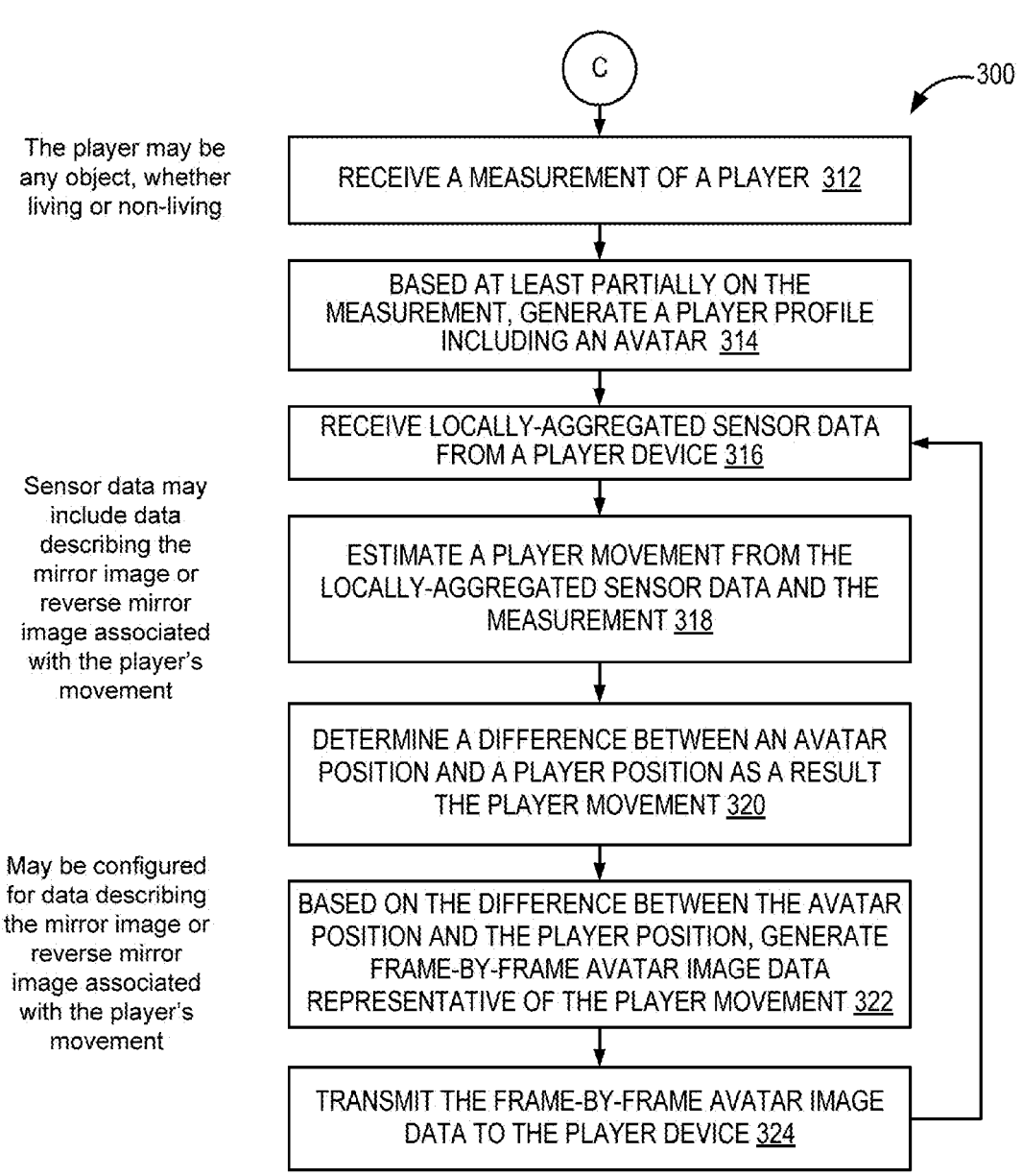
FIG. 3B shows an example flow diagram of a method of providing a single player avatar motion game.

Turning now to FIG. 3B, at block 312 the game module 112 receives a measurement of the player 102. The measurement may be described by measurement data. The player may be any object, whether living or non-living. If the player 102 is a human, then the measurement may be a biological measurement. If the player is a non-living object, then the measurement may be any other measurement of the non-living object.

At block 314, a player profile is generated. The player profile may be generated based at least in part on the measurement data. The player profile may include an avatar associated with the player 102. The player profile may include any number of avatars associated with the player 102.

At block 316, the game module 112 may receive sensor data from the player device 104. Block 316 may be implemented by a game module 112 that is a component of the game server 116. In embodiments where the game server 116 is not implemented, block 316 may be skipped or modified to include the game module 112 of a first player device 104 receiving sensor data from a second player device 104 that is different from the first player device 104. The sensor data may include data describing the mirror image or reverse mirror image associated with the movement of a player 102.

The method 300 may include transmitting the sensor data or measurement data to a filter module 238 to process the sensor data using one or more of the equations depicted in Appendix 1. For example, a filter module 238 is a hardware device communicatively coupled to the game module 112 and configured to apply equations 8 or 9 of Appendix 1 to the sensor data or measurement data. The processing provided by the filter module 238 may be configured to reduce errors present in the data or increase stability of the data. The filter module 238 may then transmit the processed sensor data or measurement data to the game module 112.

At block 318, the game module 112 may estimate player movement based on the sensor data and the measurement data. One or more of the equations described by Appendix 1 may be used to provide the determinations or estimations described herein.

At block 320, the game module 112 determines the difference between an avatar position in a virtual world and the position of the player 102 in the real world as a result of the movement of the player 102 in the real world. At block 322, the game module 112 generates frame-by-frame image data representative of the movement of the player 102. The game module 112 may generate the frame-by-frame image data based at least in part on the difference between the avatar position in a virtual world and the position of the player 102 in the real world which was determined in block 320.

At block 324, the game module 112 transmits the frame-by-frame avatar image data. The frame-by-frame avatar image data may be stored in a memory. In some embodiments, the game module 112 is an element of the game server 116 and the game module 112 transmits the frame-by-frame avatar image data to the player device 104 which then operates to render the graphical images corresponding to the frame-by-frame avatar image data on the display 106. The player device 104 may then render a graphical representation of the avatar moving in the virtual world to correspond to the movement of the player 102 in the real world based on the frame-by-frame avatar image data.

Figure 3C:
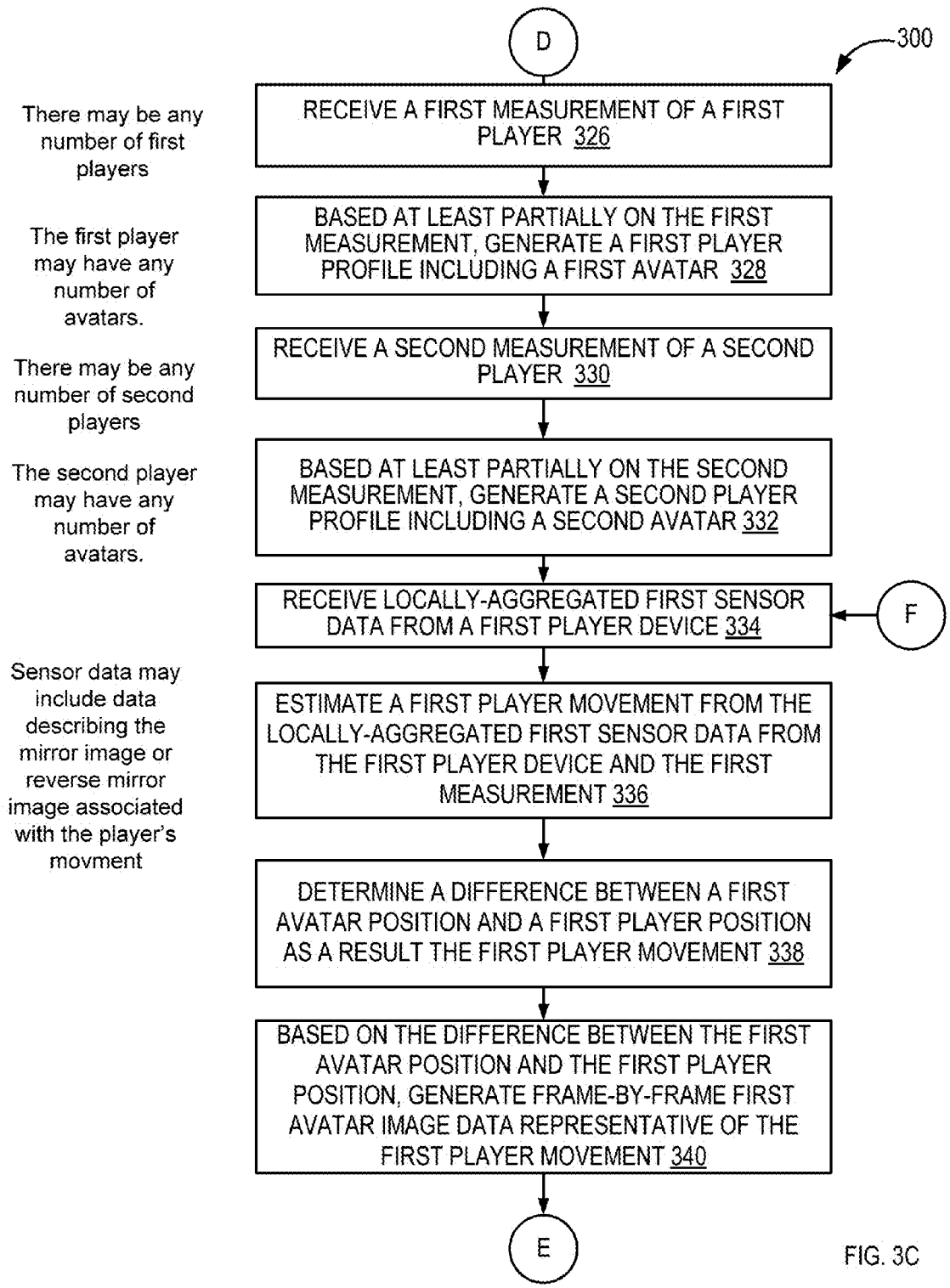
FIGS. 3C and 3D show an example flow diagram of a method of providing a multiple player avatar motion game.

Turning now to FIG. 3C, at block 326 the game module 112 receives a measurement of a first player 102. The measurement may be described by first measurement data associated with the first player 102. The first player 102 may be any object, whether living or non-living. If the first player 102 is a human, then the measurement may be a biological measurement. If the first player 102 is a non-living object, then the measurement may be any other measurement of the non-living object. There may be any number of first players 102.

At block 328, a first player profile is generated. The first player profile may be generated based at least in part on the measurement data. The first player profile may include an avatar associated with the first player 102. The first player profile may include any number of avatars associated with the first player 102.

At block 330 the game module 112 receives a measurement of a second player 102. The measurement may be described by second measurement data associated with the second player 102. The second player 102 may be any object, whether living or non-living. If the second player 102 is a human, then the measurement may be a biological measurement. If the first player 102 is a non-living object, then the measurement may be any other measurement of the non-living object. There may be any number of first players 102.

At block 332, a second player profile is generated. The second player profile may be generated based at least in part on the second measurement data. The second player profile may include an avatar associated with the second player 102. The second player profile may include any number of avatars associated with the second player 102.

At block 334, the game module 112 may receive first sensor data from a first player device 104 associated with the first player 102. Block 334 may be implemented by a game module 112 that is a component of the game server 116. In embodiments where the game server 116 is not implemented, block 334 may be skipped or modified to include the game module 112 of a second player device 104 receiving first sensor data from a first player device 104 that is different from the second player device 104. The first sensor data may include data describing the mirror image or reverse mirror image associated with the movement of a first player 102.

The method 300 may include transmitting the first sensor data or first measurement data to a filter module 238 to process the first sensor data or first measurement data using one or more of the equations depicted in Appendix 1. For example, a filter module 238 is a hardware device communicatively coupled to the game module 112 and configured to apply equations 8 or 9 of Appendix 1 to the sensor data or measurement data. The processing provided by the filter module 238 may be configured to reduce errors present in the data or increase stability of the data. The filter module 238 may then transmit the processed sensor data or measurement data to the game module 112.

At block 336, the game module 112 may estimate player movement for the first player based on the first sensor data and the first measurement data. At block 338, the game module 112 may determine the difference between a position of a first avatar in a virtual world and the position of the first player 102 in the real world as a result of the movement of the first player 102 in the real world. The first avatar may be associated with the first player 102. The movement of the first avatar in the virtual world may correspond to the movement of the first player 102 in the real world so that the game module 112 enables the first player 102 to control the actions of the first avatar in the virtual world using the actions of the first player 102 in the real world.

At block 338, the game module 112 generates frame-by-frame first image data representative of the movement of the first player 102. The game module 112 may generate the frame-by-frame first image data based at least in part on the difference between the position of the first avatar in a virtual world and the position of the first player 102 in the real world which was determined in block 320.

Figure 3D:
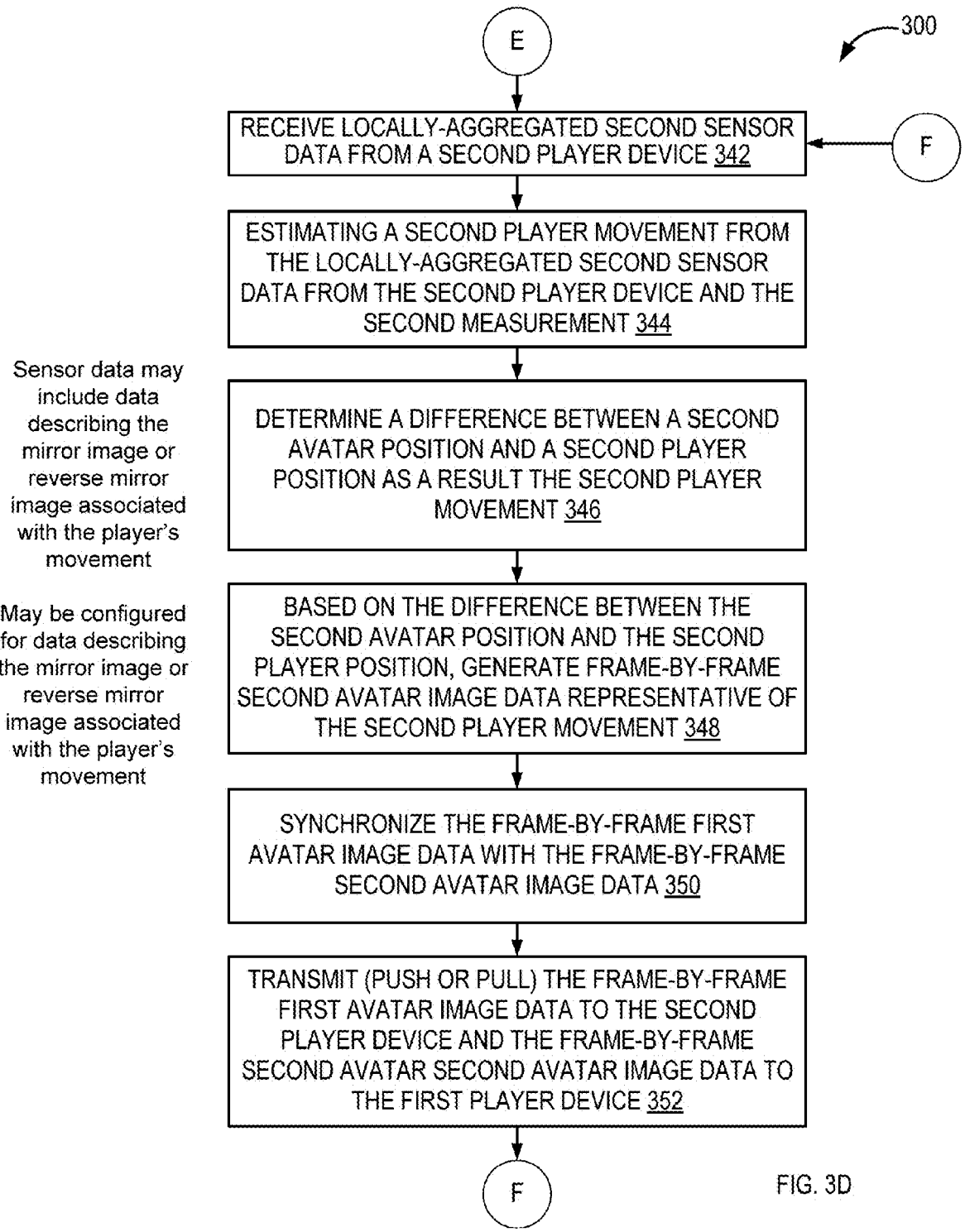

Turning now to FIG. 3D, at block 342, the game module 112 may receive second sensor data from a second player device 104 associated with the second player 102. Block 342 may be implemented by a game module 112 that is a component of the game server 116. In embodiments where the game server 116 is not implemented, block 342 may be skipped or modified to include the game module 112 of a first player device 104 receiving second sensor data from a second player device 104 that is different from the first player device 104. The second sensor data may include data describing the mirror image or reverse mirror image associated with the movement of a second player 102.

The method 300 may include transmitting the second sensor data or second measurement data to a filter module 238 to process the second sensor data or second measurement data using one or more of the equations depicted in Appendix 1. For example, a filter module 238 may be code and routines communicatively coupled to the game module 112 and configured to apply equations 8 or 9 of Appendix 1 to the sensor data or measurement data. The processing provided by the filter module 238 may be configured to reduce errors present in the data or increase stability of the data. The filter module 238 may then transmit the processed sensor data or measurement data to the game module 112.

At block 344, the game module 112 may estimate player movement for the second player based on the second sensor data and the second measurement data. At block 346, the game module 112 may determine the difference between a position of a second avatar in a virtual world and the position of the second player 102 in the real world as a result of the movement of the second player 102 in the real world. The second avatar may be associated with the second player 102. The movement of the second avatar in the virtual world may correspond to the movement of the second player 102 in the real world so that the game module 112 enables the second player 102 to control the actions of the second avatar in the virtual world using the actions of the second player 102 in the real world.

At block 348, the game module 112 generates frame-by-frame second image data representative of the movement of the second player 102. The game module 112 may generate the frame-by-frame second image data based at least in part on the difference between the position of the second avatar in a virtual world and the position of the second player 102 in the real world which was determined in block 344.

At block 350, the game module 112 may synchronize the frame-by-frame first avatar image data with the frame-by-frame second avatar image data. The synchronization provided by block 350 may beneficially provide a graphical representation on a display that depicts both the first avatar and the second avatar in a virtual world. The first avatar and the second avatar may be interacting with one another or other objects in the virtual world. The movement of the avatars may correspond to the movement of the players 102 in real time or near real time. The functionality provided by the filter module 238 applying the equations of Appendix 1 may beneficially increase the accuracy of the avatar movement. The functionality of the filter module 238 may also beneficially provide real time or near real time rendering of the avatar movement corresponding to the real world movement of players 102. The functionality of the filter module 238 may also increase stability.

At block 352, the game module 112 may transmit the frame-by-frame first avatar image data to the second player device 104 and the frame-by-frame second avatar image data to the first player device 104.

Some embodiments described herein include a non-transitory computer-readable medium having computer instructions stored thereon that are executable by a processing device to perform one or more of the operations included in the method 300 of FIG. 3, such as the operations illustrated by blocks 301-352 in FIG. 3, or variations thereof. The non-transitory computer-readable medium may include the memory 230 of FIG. 2, for example. The processing device may include the processor 234 of FIG. 2, for example.

Figure 4:
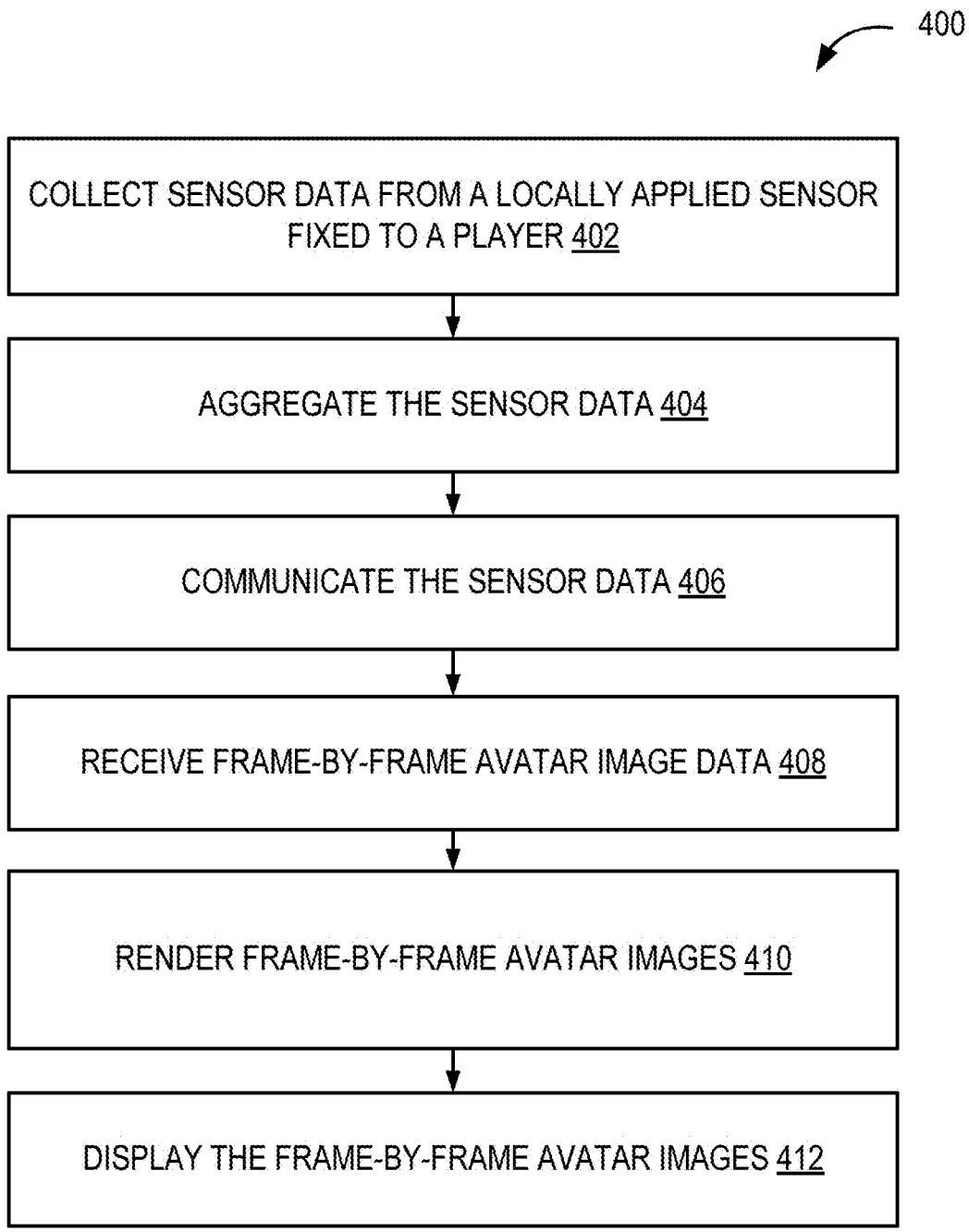
FIG. 4 shows an example flow diagram of a method for rendering frame-by-frame avatar images.

FIG. 4 shows an example flow diagram of a method 400 for rendering frame-by-frame avatar images. At block 402, the game module 112 may collect sensor data from one or more sensors 114 associated with a player 102. At block 404, the game module 112 may aggregate the sensor data 404.

At block 406, the game module 112 may communicate the sensor data to the elements of the game module 112, the game server 116 or a different game module 112 associated with a different player device 104. For example, in embodiments where some of the processing of the game module 112 are provided by the game server 116, the sensor data may be communicated to a different game module 112 that is an element of the game server 116.

At block 408, the game module 112 may receive frame-by-frame avatar image data. At block 410, the game module 112 may render frame-by-frame avatar images associated with the frame-by-frame avatar image data. At block 412, the game module 112 may display the frame-by-frame avatar images.

Figure 5:
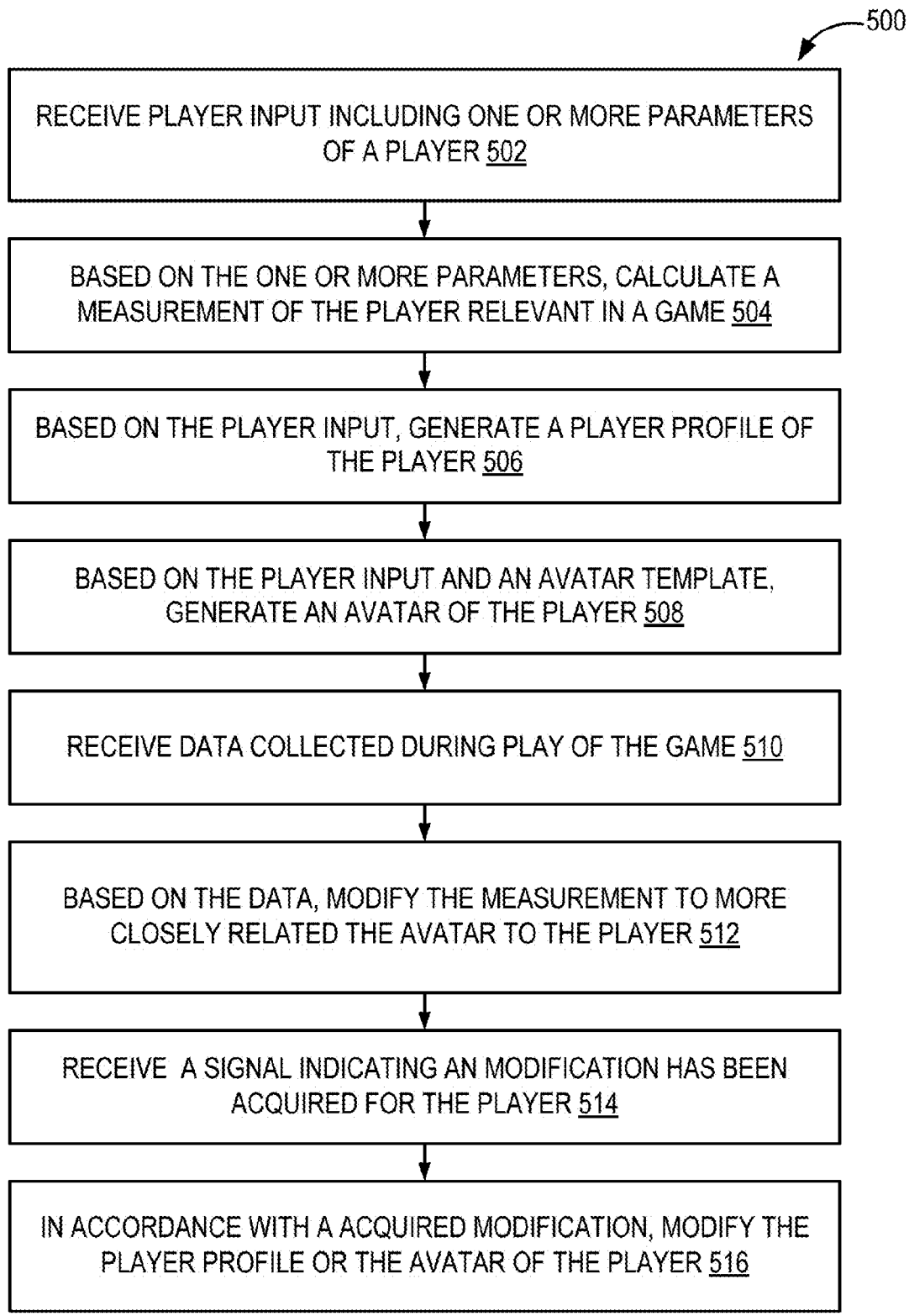
FIG. 5 shows an example flow diagram of a method for generating avatars and providing a store experience for a player to modify a player profile or avatar.

FIG. 5 shows an example flow diagram of a method 500 for generating avatars and providing a store experience for a player 102 to modify a player profile or avatar;

At block 502, the game module 112 receives player input including one or more parameters of the player 102. The parameters may be biological parameters or any other parameters. At block 504, the game module 112 calculates a measurement of the player 102. The measurement may be calculated based on the parameters received at block 502. At block 506, the game module 112 generates a player profile. The measurement may be used to generate an avatar of the player 102 for representing the player in the virtual world. At block 508, the game module 112 generates an avatar associated with the player 102. The player 102 may have any number of avatars. The avatars may be a component of the player profile associated with a player 102. At block 510, the game module 112 receives data collected play of the game. This data may be used to improve the avatar so that the motion of the avatar more closely approximates the real world motion of the player 102. At block 512, the game module 112 modifies the measurements for the avatar associated with the player 102 so that the actions of the avatar in the virtual world more closely approximate the activities of the player 102 in the real world. In this way, the game module 112 enables a player 102 to train the game module 112 to create avatars that more closely approximate the player 102 in the virtual world.

A player may further modify an avatar through acquisitions. For example, a player 102 may purchase modifications in a store or marketplace or through prizes earned through bidding. In one embodiment, different players 102 may exchange avatar modifications with one another. At block 514, the game module 112 receives a signal that a modification has been acquired for a player 102. At block 516, the game module 112 modifies the avatar or player profile in accordance with the modification indicated at block 514.

Figure 6:
FIG. 6 is a graphical user interface depicting an example set of avatars.

FIG. 6 is a graphical user interface 600 depicting an example set of avatars 602A, 602B, 602C, 602D, 602E. Note that the face of the avatars may include a three dimensional image of a human player 102 whereas the other aspects of the avatar 602A-E are not determined based on images provided by the user 102. Avatar 602B includes a three dimensional image of a human player 102 based on two or more images of the human player 102. By comparison, avatar 602C includes a two dimensional image of a human player based on one image of a different human player 102.

Appendix 2 describes an example code and routines for an arc equation module. The arc equation module may be used to calculate an arc. For example, the arc equation module may be used to determine an arc for a graphical element such as an avatar (e.g. 602A-E). The arc equation module may be used to determine one or more aspects such as (1) an arc radius and (2) one or more center points. These graphical aspects may be used to identify the positions of player 102 or avatar's shoulder, elbow or other graphical features. These positions may be used to drive the avatar to move in the virtual world in accordance with the motion of a player 102 in the real world. The arc equations of Appendix 2 may be used to determine how an avatar may act from frame-to-frame in the virtual world. For example, an arc having a radius equal to the arm length of the player 102 in the real world means the avatar should swing their arm in the virtual world. If the arc is greater than the arm length, then this means the avatar should not only swing their arm but also step forward in the virtual world.

The equations of Appendix 1 (e.g. equation 8 or 9) may be used to increase the stability or speed for acquiring coordination from a sensor 114.

Appendix 3 includes a flow chart depicting equations 8 or 9 of Appendix 1.

Appendix 4 describes an example of code and routines for a trajectory module. The trajectory module may relate to equations 8 or 9 of Appendix 1. The trajectory module may aid in increasing the stability of the output of equations 8 or 9 of the Appendix 1. The trajectory module may aid in increasing the stability of the output of the arc equation module. The trajectory module may be configured to be operable on Apple iOS according to some embodiments.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
wirelessly receiving non-sensor based player input from a first player, the player input including a set of first measurements associated with the first player, the set of first measurements describing one or more biological measurements corresponding to the first player;
generating, based on the first measurement, a first player profile associated with the first player and including a first avatar depicting a virtual embodiment of the first player in a virtual world;
wirelessly receiving first sensor data from a plurality of first sensors associated with the first player, the first sensor data describing a change in a real world position of the first player in a real world;
determining a first estimate of a first player movement based on the set of first measurements and the first sensor data so that the first estimate of the first player movement is determined based on a combination of (1) the one or more biological measurements and (2) the first sensor data describing the change in the real world position of the first player in the real world;

determining, based on the first estimate, a first difference between a first screen position of the first avatar in the virtual world and the real world position of the first player in the real world;

generating first avatar image data representative of movement of the first avatar corresponding to movement of the first player, the first avatar image data generated based on the first difference between the first screen position of the first avatar in the virtual world and the real world position of the first player in the real world;

generating a first random number based on the first sensor data that is used as a first seed for a random number generator in a first game;

causing a competition to be displayed on a display device, an outcome of the competition dependent at least in part on the first random number, wherein the competition is configured so that the first player competes with a mirror image of a plurality of movements of the first player so that the first player is playing against themselves; and accepting a bid from a second player gambling on the outcome of the competition, wherein the first movement of the first player is not the same as a second movement of the first player in a second game so that: (1) the first sensor data from the first movement and the second movement are different (2) the first seed for the first game is different than a second seed for the second game, the second seed used by the random number generator to generate a second random number; and (3) the first random number and the second random number outputted by the random number generator for the first game and the second game are truly random because the first movement and the second movement are different, thereby providing a valid game of chance for the first game and the second game.

2. The method of claim 1, wherein the first player is a movable object and the set of first measurements describes one or more parameters associated with the movable object.

3. The method of claim 1, wherein the first player profile associated with the first player includes two or more first avatars associated with the first player and depicting the virtual embodiment of the first player in the virtual world.

4. The method of claim 1, wherein the first sensor data is processed to reduce errors and increase stability by a filter module that applies the following equation to the first sensor data:

$$\hat{M}_{i+1} - \hat{M}_i = 0.5 dt (\hat{M}_{i+1} \hat{\Omega}_{i+1} + \hat{M}_i \hat{\Omega}_i).$$

5. The method of claim 1, wherein the first sensor data is processed to reduce errors and increase stability by a filter module that applies the following equation to the first sensor data:

$$\hat{M}_{i+1} = \hat{M}_i (1 + 0.5 dt \hat{\Omega}_i)(1 - 0.5 dt \hat{\Omega}_{i+1})^{-1}.$$

6. The method of claim 1, wherein the first estimate corresponds to the mirror image of the plurality of movement of the first player.

7. The method of claim 1, further comprising:

wirelessly receiving a set of second measurements associated with the second player, the set of second measurements describing one or more attributes of the second player;

generating, based on the set of second measurements, a second player profile associated with the second player and including a second avatar depicting a virtual embodiment of the second player in the virtual world;

wirelessly receiving second sensor data from a plurality of second sensors associated with the second player, the second sensor data describing a change in a real world position of the second player in the real world;

determining a second estimate of a second player movement based on the set of second measurements and the second sensor data;

determining a second difference between a second screen position of the second avatar in the virtual world and the real world position of the second player in the real world;

generating second avatar image data representative of movement of the second avatar corresponding to movement of the second player, the second avatar image data generated based on the second difference between the second screen position of the second avatar in the virtual world and the real world position of the second player in the real world; and synchronizing first image data and the second avatar image data to provide a frame-by-frame representation of the first avatar that corresponds to the first player, the second avatar that corresponds to the second player, and a third avatar that corresponds to the mirror image of the plurality of movements of the first player.

8. The method of claim 1, further comprising:

receiving a signal indicating a modification has been acquired for the first player; and modifying the representation of the first avatar in accordance with the modification acquired by the first player.

9. The method of claim 1, further comprising:

receiving image data include a three dimensional image of the first player as the first player exists in the real world;

modifying the representation of the first avatar to include at least a portion of the three dimensional image of the first player as a portion of the first avatar.

10. A system comprising:

a processor;

a non-transitory memory storing instructions that, when executed, cause the system to:

wirelessly receive non-sensor based player input from a first player, the player input including a set of first measurements associated with the first player, the set of first measurements describing one or more biological measurements corresponding to the first player;

generate, based on the first measurement, a first player profile associated with the first player and including a first avatar depicting a virtual embodiment of the first player in a virtual world;

wirelessly receive first sensor data from a plurality of first sensors associated with the first player, the first sensor data describing a change in a real world position of the first player in a real world;

determine a first estimate of a first player movement based on the set of first measurements and the first sensor data so that the first estimate of the first player movement is determined based on a combination of (1) the one or more biological measurements and (2) the first sensor data describing the change in the real world position of the first player in the real world;

determine, based on the first estimate, a first difference between a first screen position of the first avatar in the virtual world and the real world position of the first player in the real world;

generate first avatar image data representative of movement of the first avatar corresponding to movement of the first player, the first avatar image data generated based on the first difference between the first screen position of the first avatar in the virtual world and the real world position of the first player in the real world;

generate a first random number based on the first sensor data that is used as a first seed for a random number generator in a first game;

cause a competition to be displayed on a display device, an outcome of the competition dependent at least in part on the first random number, wherein the competition is configured so that the first player competes with a mirror image of a plurality of movements of the first player so that the first player is playing against themselves; and accept a bid from a second player gambling on the outcome of the competition, wherein the first movement of the first player is not the same as a second movement of the first player in a second game so that: (1) the first sensor data from the first movement and the second movement are different (2) the first seed for the first game is different than a second seed for the second game, the second seed used by the random number generator to generate a second random number; and (3) the first random number and the second random number outputted by the random number generator for the first game and the second game are truly random because the first movement and the second movement are different, thereby providing a valid game of chance for the first game and the second game.

11. The system of claim 10, wherein the first player profile associated with the first player includes two or more first avatars associated with the first player and depicting the virtual embodiment of the first player in the virtual world.

12. The system of claim 10, wherein the first sensor data is processed to reduce errors and increase stability by a filter module of the system that applies the following equation to the first sensor data:

$$\hat{M}_{i+1} - \hat{M}_i = 0.5 dt (\hat{M}_{i+1} \hat{\Omega}_{i+1} + \hat{M}_i \hat{\Omega}_i).$$

13. The system of claim 10, wherein the first sensor data is processed to reduce errors and increase stability by a filter module of the system that applies the following equation to the first sensor data:

$$\hat{M}_{i+1} = \hat{M}_i (1 + 0.5 dt \hat{\Omega}_i)(1 - 0.5 dt \hat{\Omega}_{i+1})^{-1}.$$

14. The system of claim 10, wherein the first estimate corresponds to the mirror image of the plurality of movement of the first player.

15. The system of claim 10, further comprising instructions that, when executed, cause the system to:

wirelessly receive a set of second measurements associated with a second player, the set of second measurements describing one or more attributes of the second player;

generate, based on the set of second measurements, a second player profile associated with the second player and including a second avatar depicting a virtual embodiment of the second player in the virtual world;

wirelessly receive second sensor data from a plurality of second sensors associated with the second player, the second sensor data describing a change in a real word position of the second player in the real world;

determine a second estimate of a second player movement based on the set of second measurements and the second sensor data;

determine a second difference between a second screen position of the second avatar in the virtual world and the real world position of the second player in the real world;

generate second avatar image data representative of movement of the second avatar corresponding to movement of the second player, the second avatar image data generated based on the second difference between the second screen position of the second avatar in the virtual world and the real world position of the second player in the real world; and synchronize first image data and the second avatar image data to provide a frame-by-frame representation of the first avatar that corresponds to the first player and the second avatar that corresponds to the second player, and a third avatar that corresponds to the mirror image of the plurality of movements of the first player.

16. The system of claim 10, further comprising instructions that, when executed, cause the system to:

receive a signal indicating an addition has been purchased for the first player; and modify the representation of the first avatar in accordance with the addition purchased by the first player.

17. The system of claim 10, further comprising instructions that, when executed, cause the system to:

receive image data include a three dimensional image of the first player as the first player exists in the real world;

modify the representation of the first avatar to include at least a portion of the three dimensional image of the first player as a portion of the first avatar.

18. The system of claim 10, further comprising an arc equation module stored on the memory, the arc equation module comprising instructions that, when executed, cause the system to:

determine, based on the first measurement and the first sensor data, an arc for the first avatar corresponding to the movement of the first player in the real world;

determine, based on the arc, an arc radius and one or more center points;

identify, based on the arc radius and the one or more center points, one or more real world positions describing one or more of a location and orientation of the first player in the real world; and generate first avatar image data representative of movement of the first avatar corresponding to movement of the first player in the real world, the first avatar image data generated based on the first difference between the first screen position of the first avatar in the virtual world and the one or more real world positions of the first player in the real world.

* * * * *